(12) United States Patent
Olbrich et al.

(10) Patent No.: US 11,313,961 B2
(45) Date of Patent: Apr. 26, 2022

(54) METHOD AND DEVICE FOR IDENTIFYING THE HEIGHT OF AN OBJECT

(71) Applicant: Robert Bosch GmbH, Stuttgart (DE)

(72) Inventors: Sebastian Olbrich, Leonberg (DE); Simon Klenk, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 203 days.

(21) Appl. No.: 16/633,738

(22) PCT Filed: Jun. 14, 2018

(86) PCT No.: PCT/EP2018/065887
§ 371 (c)(1),
(2) Date: Jan. 24, 2020

(87) PCT Pub. No.: WO2019/020271
PCT Pub. Date: Jan. 31, 2019

(65) Prior Publication Data
US 2020/0233073 A1    Jul. 23, 2020

(30) Foreign Application Priority Data
Jul. 26, 2017 (DE) .......................... 102017212868.2

(51) Int. Cl.
*G01S 13/42* (2006.01)
*G01S 13/931* (2020.01)
(Continued)

(52) U.S. Cl.
CPC ............ *G01S 13/42* (2013.01); *G01S 13/931* (2013.01); *G01S 15/931* (2013.01); *G01S 2013/9314* (2013.01); *G01S 2015/938* (2013.01)

(58) Field of Classification Search
None
See application file for complete search history.

(56) References Cited

U.S. PATENT DOCUMENTS 4,134,681 A    1/1979 Elmer
4,477,184 A * 10/1984 Endo .................. G01S 17/931
                                                              356/141.1
(Continued)

FOREIGN PATENT DOCUMENTS

DE         10134070 A1    1/2003
DE    102005042729 A1    3/2007
(Continued)

OTHER PUBLICATIONS

International Search Report dated Oct. 4, 2018 of the corresponding International Application PCT/EP2018/065887 filed Jun. 14, 2018.
(Continued)

*Primary Examiner* — Bernarr E Gregory
(74) *Attorney, Agent, or Firm* — Norton Rose Fulbright US LLP; Gerard Messina

(57) ABSTRACT

A device and method for identifying a position of an object uses a comparison value is calculated based on a first distance and first angle measured by a first distance sensor. This value is compared with a second distance or a second angle measured by a second distance sensor. Based on the result of the comparison, it is concluded whether the object is located above or below a predefined height over a first sensor plane in which the first distance sensor is situated. An angle of greater than zero degrees is situated in this case between a first sensor axis of the first distance sensor and a second sensor axis of the second distance sensor.

15 Claims, 9 Drawing Sheets

(51) Int. Cl.
*G01S 15/931* (2020.01)
*G01S 13/00* (2006.01)
*G01S 15/00* (2020.01)

(56) References Cited

U.S. PATENT DOCUMENTS

| | | | | |
|---|---|---|---|---|
| 5,633,705 | A * | 5/1997 | Asayama | G01S 17/931 |
| | | | | 356/3.14 |
| 5,729,234 | A | 3/1998 | Stetson, Jr. et al. | |
| 6,018,308 | A * | 1/2000 | Shirai | G01S 13/931 |
| | | | | 342/70 |
| 7,545,484 | B2 * | 6/2009 | Heimberger | G01S 13/931 |
| | | | | 356/4.01 |
| 2005/0110620 | A1 | 5/2005 | Takeichi et al. | |
| 2008/0111733 | A1 * | 5/2008 | Spyropulos | G01S 13/931 |
| | | | | 342/189 |
| 2010/0253596 | A1 | 10/2010 | Szczerba et al. | |
| 2011/0221628 | A1 * | 9/2011 | Kamo | G01S 13/931 |
| | | | | 342/70 |
| 2013/0058532 | A1 | 3/2013 | White et al. | |
| 2016/0299217 | A1 * | 10/2016 | Kim | G01S 13/931 |
| 2018/0251092 | A1 | 9/2018 | Lee et al. | |

FOREIGN PATENT DOCUMENTS

| | | | |
|---|---|---|---|
| DE | 102008038365 A1 | 1/2010 | |
| DE | 102010044556 A1 | 3/2012 | |
| EP | 2339374 A2 | 6/2011 | |
| EP | 3279690 A1 * | 2/2018 | ......... G01S 13/931 |
| JP | H10267621 A | 10/1998 | |
| JP | 2000241542 A | 9/2000 | |
| JP | 2004309175 A | 11/2004 | |
| JP | 2004317507 A | 11/2004 | |
| JP | 2007218738 A | 8/2007 | |
| JP | 2011095029 A | 5/2011 | |
| JP | 2014153211 A | 8/2014 | |
| JP | 2017125802 A | 7/2017 | |
| JP | 2020076580 A | 5/2020 | |
| WO | WO2012/175819 A1 * | 12/2012 | ......... G01S 13/878 |
| WO | 2017057041 A1 | 4/2017 | |
| WO | 2017159382 A1 | 9/2017 | |

OTHER PUBLICATIONS

Wikipedia: Triangulation, URL: https://de.wikipedia.org/w/index.php?title=Triangulation_(Messtechnik)&oldid=163307795 (rechnerchiert am Feb. 22, 2018).

Wikipedia: Lateration URL:https://de.wikipedia.org/w/index.php?title=Lateration&oldid=165810691 (recherchiert am Feb. 22, 2018).

* cited by examiner

METHOD AND DEVICE FOR IDENTIFYING THE HEIGHT OF AN OBJECT

CROSS-REFERENCE TO RELATED APPLICATIONS

The present application is the national stage of International Pat. App. No. PCT/EP2018/065887 filed Jun. 14, 2018, and claims priority under 35 U.S.C. § 119 to DE 10 2017 212 868.2, filed in the Federal Republic of Germany on Jul. 26, 2017, the content of each of which are incorporated herein by reference in their entireties.

FIELD OF THE INVENTION

The present invention relates to a device and a method for identifying a position of an object.

BACKGROUND

Radar sensors are nowadays conventional means for measuring the distance and frequently also the speed relative to a reflecting object. The intended purpose ranges from applications for motion detection and presence detection such as, for example, in automatically flushing toilets, to applications for line detection in walls to distance-regulating motor vehicle radar systems.

Newer functions of highly automated driving require a multitude of sensors, radar sensors also being used. In this case, radar sensors are installed out of view behind the bumpers of a motor vehicle and measure the distances to the surrounding objects. These distances are appropriately displayed to the driver, a visual or acoustic display taking place, for example. In principle, a radar wave, for example, 24 GHz, 77 GHz, or 79 GHz is emitted in the process by a sensor and is reflected on an object, in order to subsequently measure a time difference between the emission and an arrival of the radar wave at the sensor as a measure of the distance. The emission in this case can take place as a pulse (for example, short pulse method), or also continuously (for example, FMCW method, chirp sequence). The bandwidths used in this case are approval-related relative to the base frequency (for example 1% to 5% bandwidth relative to the base frequency).

One disadvantage of radar sensors is that partially low objects made of metal (for example, manhole covers) cause a significantly stronger reflection than tall weak objects (for example, broom handles). For parking applications, however, it is important to estimate the height of objects. For objects that are low and are therefore able to be driven over, no warning must be given (for example, manhole covers, cola can). A warning should be given as soon as an object is able to cause damage to the vehicle. Parking sensors are also increasingly used for additional functions, which require an active intervention. Such sensors are thus also used, for example, for emergency braking functions. A height estimate of objects is indispensable with these functions. Other functions using radar sensors also require a reliable distinction between objects that can be driven over and objects that cannot be driven over.

Presently only the pieces of information from individual sensors are used for estimating height. The number of sensors in a vehicle is also increased due to the increasing automation of driver assistance functions. Future vehicles will have up to five radar sensors installed for the standard radar functions. In addition, a further increase in the number of sensors will be required, for example, for parking functions and for highly automated driving functions, in order to reliably detect objects in the full immediate vicinity of a vehicle. This plurality of sensors can be used in order to estimate the height of an object.

SUMMARY

A device according to the present invention for identifying a position of an object includes a first distance sensor, which has a sensor axis situated in a first sensor plane and is configured to detect a first distance between the first distance sensor and an object and to detect a first angle, which is an angle between the first sensor axis and a direction in which, starting from the first distance sensor, the object is situated when the sensor is situated in the first sensor plane; a second distance sensor, which has a second sensor axis situated in a second sensor plane and is configured to detect a second distance between the second distance sensor and the object, and/or to detect a second angle, which is an angle between the second sensor axis and a direction in which, starting from the second distance sensor, the object is situated when the object is situated in the second sensor plane, an angle of greater than zero degrees existing between the first sensor axis and the second sensor axis; and an evaluation unit, which is configured to determine, based on the first distance, on the first angle, and on at least the second distance and/or the second angle, whether the object is located above or below a predefined height over the first sensor plane.

A method according to the present invention for identifying a position of an object using a first distance sensor, which has a first sensor axis situated in a first sensor plane, and using a second distance sensor, which has a second sensor axis situated in a second sensor plane, an angle of greater than zero degrees existing between the first sensor axis and second sensor axis, includes detecting a first distance between the first distance sensor and an object, detecting a first angle that is between the first sensor axis and a direction in which, starting from the first distance sensor, the object is situated when the object is situated in the first sensor plane, detecting a second distance between the second distance sensor and the object and/or a second angle that is between the second sensor axis and a direction in which, starting from the second distance sensor, the object is situated when the object is situated in the second sensor plane, and determining, based on the first distance, on the first angle, and on at least the second distance and/or on the second angle, whether the object is located above or below a predefined height over the first sensor plane.

The first distance sensor and the second distance sensor have a sensor axis situated in a sensor plane. The sensor plane is a plane in which the respective distance sensor is situated. The respective sensor axis of a distance sensor is an axis, which is perpendicular to a direction defined by a primary detection direction. The respective sensor axis is situated, in particular, perpendicular to the main lobe of the respective distance sensor.

The first distance sensor is suitable for detecting a first angle that is between the first sensor axis and a direction in which, starting from the first distance sensor, the object is situated when the object is situated in the first sensor plane. In other words, this means that, in addition to a distance, the first distance sensor is suitable for detecting a direction in which the object is situated with respect to the first distance sensor. In this case, the first angle is an angle that correctly describes the position of an object in the sensor plane. The first distance sensor is thus suitable for correctly detecting the position of the object in the first sensor plane. In this case, the first distance sensor is, in particular, suitable for detecting merely one single angle, which describes the position of the object with respect to the first distance sensor. If the first object is situated in the first sensor plane, then the first angle is also situated in the first sensor plane. Thus, the first distance sensor is able to detect at least in one plane, in which direction the object is situated. If, for example, the first sensor plane is a horizontal plane, then it can be detected by the first distance sensor whether the object is situated to the left or to the right of the first distance sensor. How far to the left or to the right of the first sensor axis the object is situated is described by the first angle. If the object is situated outside the first sensor plane, this object is still detected by the first distance sensor and a measured value for the first angle is output by the first distance sensor, which is then no longer situated in the sensor plane.

The foregoing explanations regarding the first distance sensor apply equally to the second distance sensor. Thus, an identification of a position or a deviation of an object outside the first or second sensor plane is made possible, without one of the distance sensors alone being configured to directly measure this deviation from the first sensor plane or from the second sensor plane. Thus, for example, both distance sensors are each configured to detect whether the object is situated to the left or to the right of the respective distance sensor. However, neither of the two distance sensors is, in particular, configured to measure whether the object is situated above or below the respective sensor plane.

An angle of greater than 0°, preferably greater than 1°, further preferably greater than 5° exists between the first sensor axis and the second sensor axis. In other words, this means that the first distance sensor and the second distance sensor are tilted toward each other. The angle at which the first distance sensor is tilted with respect to the second distance sensor, i.e., the angle between the first sensor axis and the second sensor axis, is situated in this case in the first sensor plane or in the second sensor plane. The first distance and the second distance each describe a measured distance between one of the distance sensors and the object.

Thus, the pieces of information of multiple sensors are used for a height classification. This is therefore advantageous since increasingly, multiple sensors are situated on a vehicle. The method according to the present invention is therefore advantageously implementable in a modern vehicle. Thus, for example, up to six ultrasonic sensors per bumper are installed for parking functions. Multiple sensors are also used in order to implement the parking function using radar sensors. Functions such as highly automated driving also require multiple distance sensors in order to cover the full area around the vehicle.

In addition to relative speed and distance, contemporary distance sensors, in particular, radar sensors are often also able to directly determine a horizontal angle. This means, the distance sensors are able to determine an angle in a sensor plane. Whether the angle situated in a sensor plane is a horizontal angle is a function of how the respective distance sensor is oriented. Objects are detected by multiple sensors because the fields of vision of individual distance sensors overlap. Thus, it is possible to determine the position of an object using an individual distance sensor, as well as via a trilateration of the signals of multiple distance sensors. With this overdeterminacy, it is possible to identify whether it is a tall or low object. The unknown elevation angle can also be determined by this overdeterminacy and by solving an equation. This is achieved by determining whether the object is located above or below a predefined height over the first sensor plane. In this case, a definition of whether an object is tall or low is a function of the arrangement of the first sensor plane with respect to a reference surface, for example, a roadway surface. Thus, a height above the first sensor plane is initially assessed regardless of the arrangement of the device, for example, on a vehicle. A height in this case is a shortest distance between the object and the first sensor plane.

Thus, an identification of a position of an object is made possible using multiple individual distance sensors, it being possible to resort to distance sensors which are suitable solely for identifying one position of an object in a plane.

It is obvious that the position of an object can be detected by a direct measurement of an individual distance sensor if the first or second distance sensor is suitable for detecting more than one single angle. However, identifying according to the present invention a position of an object, in particular, identifying whether this object is located at a particular height over the first sensor plane, is also advantageous for such distance sensors, since a particularly reliable identification is made possible, which can also serve, in particular, as a verification of a direct measurement.

The method and the device are also advantageous, since the necessary distance sensors are for the most part already present in modern vehicles.

The evaluation unit is preferably configured to calculate a first comparison value based on the first distance and on the first angle, which describes a value that corresponds to the second distance if the object is located at a predefined height over the first sensor plane, and to carry out a comparison between the second distance and the first comparison value, in order to determine whether the object is located above or below the predefined height over the first sensor plane or, to calculate a second comparison value based on the first distance and the first angle, which describes a value that corresponds to the second angle if the object is located at a predefined height over the first sensor plane, and to carry out a comparison between the second angle and the second comparison value, in order to determine whether the object is located above or below the predefined height over the first sensor plane. Ascertaining comparison values in such a way allows for a rapid evaluation with respect to a height of the object to take place. In the process, it is not necessary to solve a complex equation system and to ascertain exactly a height of the object. A height estimation using the comparison value can be sufficient in order, for example, to determine whether or not an object represents an obstacle.

The first comparison value is calculated preferably based on the first distance, on the first angle, and on the second angle, and the second comparison value is calculated based on the first distance, on the second distance, and on the first angle. These values are available regardless, in particular, if the first and the second distance sensors are structurally identical sensors. Thus, the first and second comparison values can be particularly precisely and simply ascertained.

It is also advantageous if the first sensor plane and the second sensor plane are parallel planes. The position of the object can thus be particularly accurately determined in the first sensor plane.

It is further advantageous if the first sensor plane and the second sensor plane are identical planes. Thus, it can be concluded based on one single plane how high or low an object is situated with respect to this shared plane.

It is further advantageous if the first sensor plane and/or the second sensor plane are horizontal planes. This means that the first distance sensor and the second distance sensor are situated in such a way that the orientation of the first sensor plane and/or of the second sensor plane is/are horizontal. In addition, the first distance sensor and the second distance sensor are situated preferably on a vehicle.

It is also advantageous if the device also includes a third distance sensor, which has a third sensor axis situated in a third sensor plane and is suitable for detecting a third distance between the first distance sensor and the object, the evaluation unit being configured, based on the third distance, to validate whether it has been correctly determined that the object is located above or below the predefined height over the first sensor plane. The reliability of the identified position of the object is thereby enhanced.

The device for identifying a position of an object preferably includes a third distance sensor, which has a third sensor axis situated in a third sensor plane, the third sensor plane not being equal to the first sensor plane and the second sensor plane, and being configured to detect a third distance between the first distance sensor and the object, and/or to detect a third angle, which describes an angle between the third sensor axis and a direction in which, starting from the third distance sensor, the object is situated when the object is situated in the third sensor plane, the evaluation unit being configured to ascertain based on the third distance and or on the third angle whether the object is located above or below the first or second sensor plane. This can avoid an object situated high from being interpreted as an object situated low.

The first and the second comparison values are preferably ascertained based on a table. Thus, it is no longer necessary to constantly recalculate the comparison value. Merely a combination of the parameters underlying the respective comparison value need be identified in the table in order to determine the first or second comparison value.

It is further advantageous if the comparison value is ascertained based on a predefined distance between the first distance sensor and the second distance sensor. Because the distance is predefined, it is not necessary to carry out additional measurements in order to ascertain the distance between the first distance sensor and the second distance sensor.

The first distance sensor and/or the second distance sensor is/are preferably a radar sensor, an acoustic sensor, or a visual sensor. The first distance sensor and the second distance sensor in this case are different types or identical types of sensors. The previously cited distance sensors can be purchased at reasonable cost and have sufficient accuracy in order to enable the position of the object with respect to the first sensor plane to be reliably identified.

Example embodiments of the present invention are described in detail below with reference to the accompanying drawings.

DETAILED DESCRIPTION

A device according to the present invention for identifying a position of an object 5 includes a first distance sensor 1, a second distance sensor 6, and an evaluation unit 10.

Figure 1:
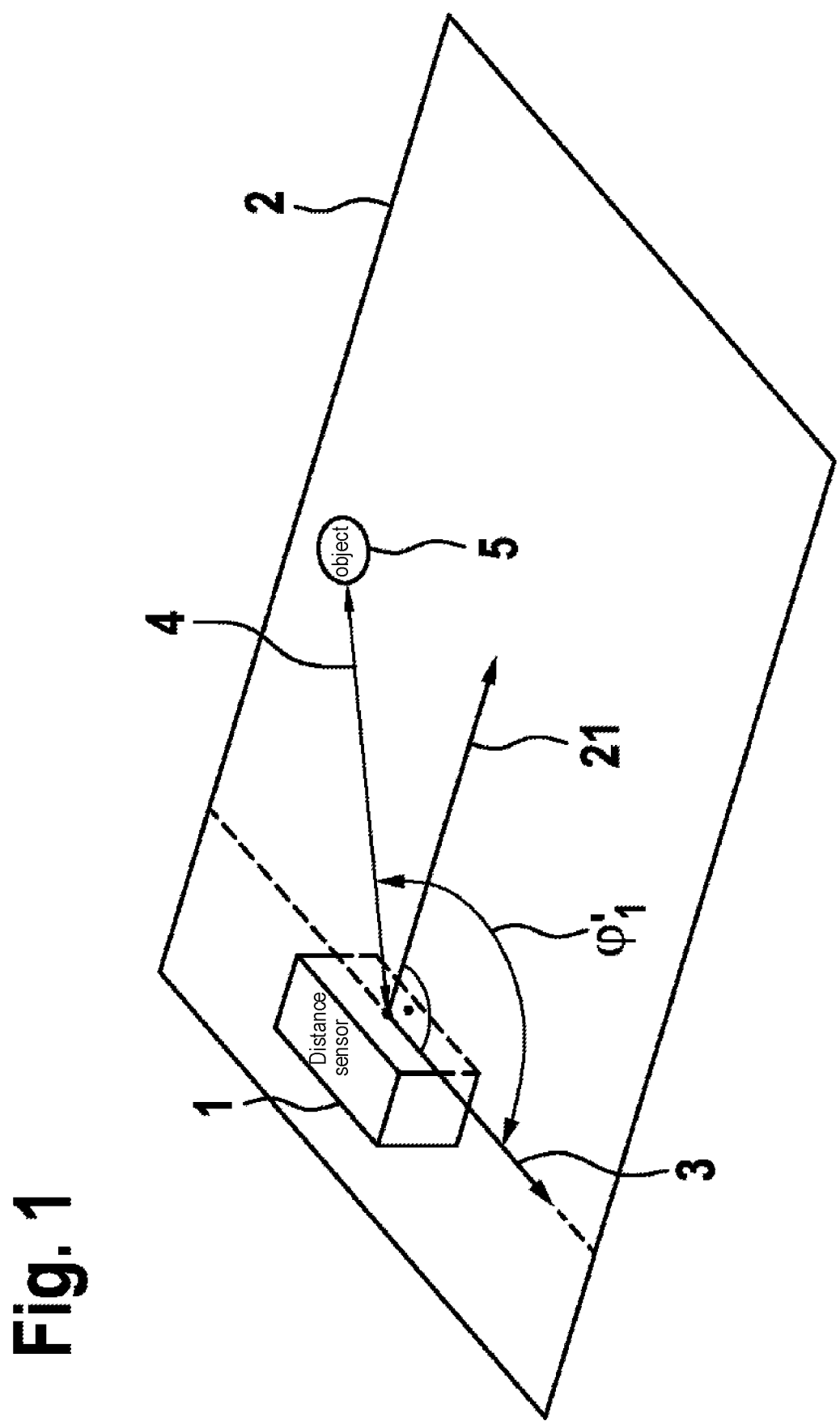
FIG. 1 shows a representation of a first distance sensor in a first sensor plane and of a sensor axis situated in the first sensor plane, according to an example embodiment of the present invention.

First distance sensor 1 is schematically depicted in FIG. 1. First distance sensor 1 has a first sensor axis 3, which is situated in a first sensor plane 2. First sensor plane 2 and first sensor axis 3 in this case are not physical elements, but merely describe properties of first distance sensor 1. First distance sensor 1, for example, is an acoustic sensor, a visual sensor, or a radar sensor. First sensor plane 2 is a plane in which first distance sensor 1 is situated. First distance sensor 1 has a main lobe, which is directed along a main radiating axis 21 of first distance sensor 1. First sensor axis 3 is perpendicular to main radiating axis 21.

First distance sensor 1 is configured to detect a first distance 4 between first distance sensor 1 and an object 5. Object 5 is also depicted by way of example in FIG. 1 and is situated in this case in first sensor plane 2. A signal is emitted and its reflection is received by first distance sensor 1. First distance 4 between object 5 and first distance sensor 1 is ascertained from a propagation time of the signal.

First distance sensor 1 is further configured to detect a first angle $\varphi_1'$, which is an angle between first sensor axis 3 and a direction in which object 5, starting from first distance sensor 1, is situated. First angle $\varphi_1'$, for example, is an angle between first sensor axis 3 and a straight line, which connects object 5 to first distance sensor 1. Thus, first distance sensor 1 is suitable for ascertaining whether object 5, as viewed from first distance sensor 1, is situated to the left or to the right of main radiation axis 21 of first distance sensor 1. First distance sensor 1 in this first example embodiment is not suitable for ascertaining whether object 5 is situated over or under first sensor plane 2. However, since the signal from first distance sensor 1 is radiated not only in the first sensor plane, an emitted signal is also reflected by object 5 when object 5 is not situated in first sensor plane 2. Since first distance 4 is ascertained based on the propagation time of the signal, a correct value for first distance 4 is therefore also ascertained when object 5 is not situated in first sensor plane 2.

Figure 2:
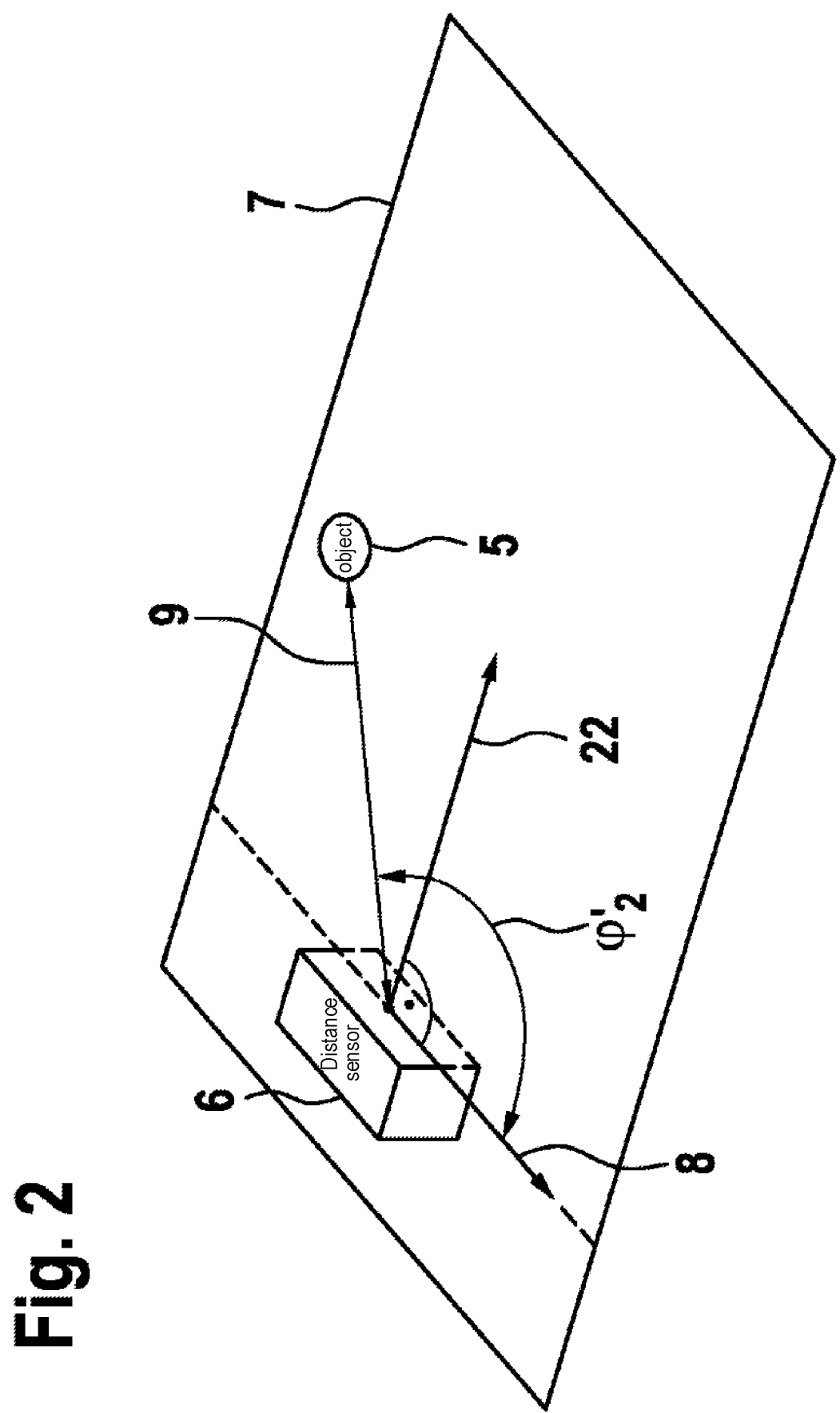
FIG. 2 shows a representation of a second distance sensor in a second sensor plane and of a second sensor axis situated in the second sensor plane, according to an example embodiment of the present invention.

Second distance sensor 6 is schematically depicted in FIG. 2. Second distance sensor 6 has a second sensor axis 8, which is situated in a second sensor plane 7. Second sensor plane 7 and second sensor axis 8 in this case are not physical elements, but merely describe properties of second distance sensor 6. Second distance sensor 6, for example, is an acoustic sensor, a visual sensor, or a radar sensor. Second sensor plane 7 is a plane in which second distance sensor 6 is situated. Second distance sensor 6 includes a main lobe, which is directed along a main radiation axis 22 of second distance sensor 6. Second sensor axis 8 is perpendicular to the main radiation axis.

Second distance sensor 6 is configured to detect a second distance 9 between second distance sensor 6 and object 5. Object 5 is also depicted by way of example in FIG. 2 and in this case is situated in second sensor plane 7. A signal is radiated and its reflection is received by second distance sensor 6. Second distance 9 between object 5 and second distance sensor 6 is ascertained from the propagation time of the signal.

Second distance sensor 6 is further configured to detect a second angle $\varphi_2{}'$, which is an angle between second sensor axis 8 and a direction, in which object 5, starting from second distance sensor 6, is located. Second angle $\varphi_2{}'$, for example, is an angle between second sensor axis 8 and a straight line, which connects object 5 to second sensor axis 6. Second distance sensor 6 is thus suitable for ascertaining whether object 5, as viewed from second distance sensor 6, is situated to the left or to the right of main radiation axis 22 of second distance sensor 6. Second distance sensor 6 in this first example embodiment is not suitable for ascertaining whether object 5 is situated over or under second sensor plane 7. However, since the signal from second distance sensor 6 is radiated not only in second sensor plane 7, an emitted signal is also reflected by object 5 when object 5 is not situated in second sensor plane 7. Since second distance 9 is ascertained based on the propagation time of the signal, a correct value for second distance 9 is therefore also ascertained when object 5 is not situated in first sensor plane 2.

Figure 3:
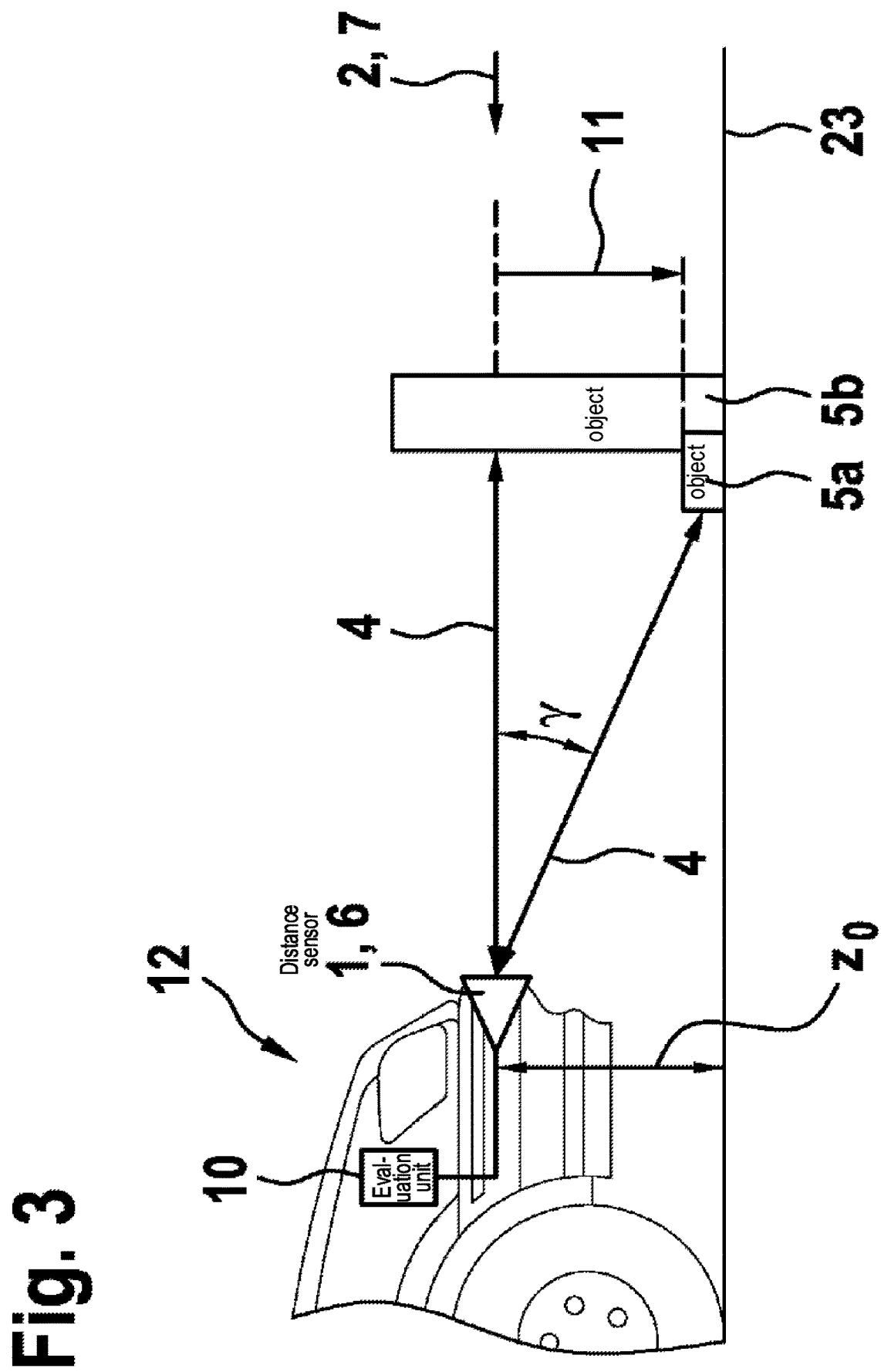
FIG. 3 shows a representation of an arrangement of a device according to the present invention on a vehicle, according to an example embodiment of the present invention.

FIG. 3 shows a vehicle 12 on which the device according to the present invention for identifying a position of an object 5 is situated. In this case, a vehicle front of vehicle 12 is depicted to the left in FIG. 3. First distance sensor 1 and second distance sensor 6 are situated in the area of the bumper of vehicle 12. In the view depicted in FIG. 3, first distance sensor 1 and second distance sensor 6 are situated one behind the other from the perspective of the observer.

First distance sensor 1 and second distance sensor 6 are connected to evaluation unit 10. Evaluation unit 10 is a processing unit, which is configured to process the output signals of first distance sensor 1 and of second distance sensor 6. First distance 4 and first angle $\varphi_1{}'$ are thus transmitted to evaluation unit 10 by first distance sensor 1. Second distance 9 and second angle $\varphi_2{}'$ are thus transmitted to evaluation unit 10 by second distance sensor 6. Object 5 is depicted in front of vehicle 12 in FIG. 3. Object 5 in this case is a first object 5a, for example, which has a minimal height above a roadway surface on which vehicle 12 is located. Object 5 is further depicted by way of example as a second object 5b, which rises significantly further above the roadway surface than first object 5a. First distance 4 is depicted for both exemplary objects 5a, 5b. This distance is identical for both first object 5a as well as for second object 5b. It is nevertheless apparent that first object 5a is located closer to vehicle 12 than second object 5b.

First sensor plane 2 is a horizontal plane in FIG. 3. Second sensor plane 7 is also a horizontal plane and corresponds to first sensor plane 2. Since vehicle 12 is depicted in a side view in FIG. 3, first sensor plane 2 and second sensor plane 7 are recognizable merely in a section line.

As previously described, first distance sensor 1 and second distance sensor 6 are suitable for detecting an angle, i.e., first angle $\varphi_1{}'$ and second angle $\varphi_2{}'$ in first sensor plane 2 and in second sensor plane 7. Angle $\gamma$ depicted in FIG. 3, which would be used to distinguish first object 5a from second object 5b, i.e., a low object from a tall object, is not able to be measured by a single one of distance sensors 1, 6 alone.

To allow for such a distinction of low and tall object 5a, 5b, and thus to identify the position of object 5, evaluation unit 10 is configured to calculate a comparison value, which is continuously compared with a measured value of second distance sensor 6. Based on whether the measured value of second distance sensor 6 is greater or smaller than the comparison value, it is identified whether a low or tall object 5a, 5b is present, i.e., whether object 5 is located more or less at a predefined height 11 over first sensor plane 2.

Predefined height 11 is a distance of object 5 relative to sensor plane 2. This is also depicted in FIG. 3. Thus, FIG. 3 depicts, by way of example, predefined height 11, which describes a distance of low object 5a relative to sensor plane 2. The further away object 5 is from first sensor plane 2, the greater the distance of object 5 is relative to first sensor plane 2. The distance of object 5 relative to first sensor plane 2, by which predefined height 11 is defined, is not to be confused with the height of object 5, which describes a height of object 5 above a roadway surface 23. Starting from roadway surface 23, the height of an object 5 increases further, at the same time the distance relative to first sensor plane 2 decreases until object 5 is situated in first sensor plane 2. Predefined height 11 describes a distance of object 5 from first sensor plane 2. For the sake of simplicity, predefined height 11 is equal to 0. This means, it is checked by evaluation unit 10 whether object 5 is located in first sensor plane 2. If predefined height 11 were to be selected at a value of 5 cm, it would then be checked whether object 5 is situated more than 5 cm under first sensor plane 2.

To determine whether object 5 is located more or less than the predefined height 11 over first sensor plane 2, either a first comparison value or a second comparison value is calculated by evaluation unit 10. The calculation of the first comparison value and the calculation of the second comparison value are based in this case on the same mathematical principle, different parameters being utilized for a subsequent comparison, however.

Thus, the first comparison value is calculated based on first distance 4, on first angle $\varphi_1{}'$, and on second angle $\varphi_2{}'$. The first comparison value corresponds to second distance 9 when object 5 is located at a predefined height 11 over first sensor plane 2. Accordingly, a comparison between second distance 9 detected by second distance sensor 6 and the first comparison value takes place, in order to determine whether object 5 is located above or below predefined height 11 over first sensor plane 2.

The second comparison value, if it is calculated, is computed based on first distance 4, on second distance 9, and on first angle $\varphi_1{}'$. The second comparison value corresponds to second angle $\varphi_2{}'$ when object 5 is located at a predefined height 11 over first sensor plane 2. Accordingly, a comparison between second angle $\varphi_2{}'$ detected by second distance sensor 6 and the second comparison value takes place in this case, in order to determine whether object 5 is located above or below predefined height 11 over first sensor plane 2.

Figure 4:
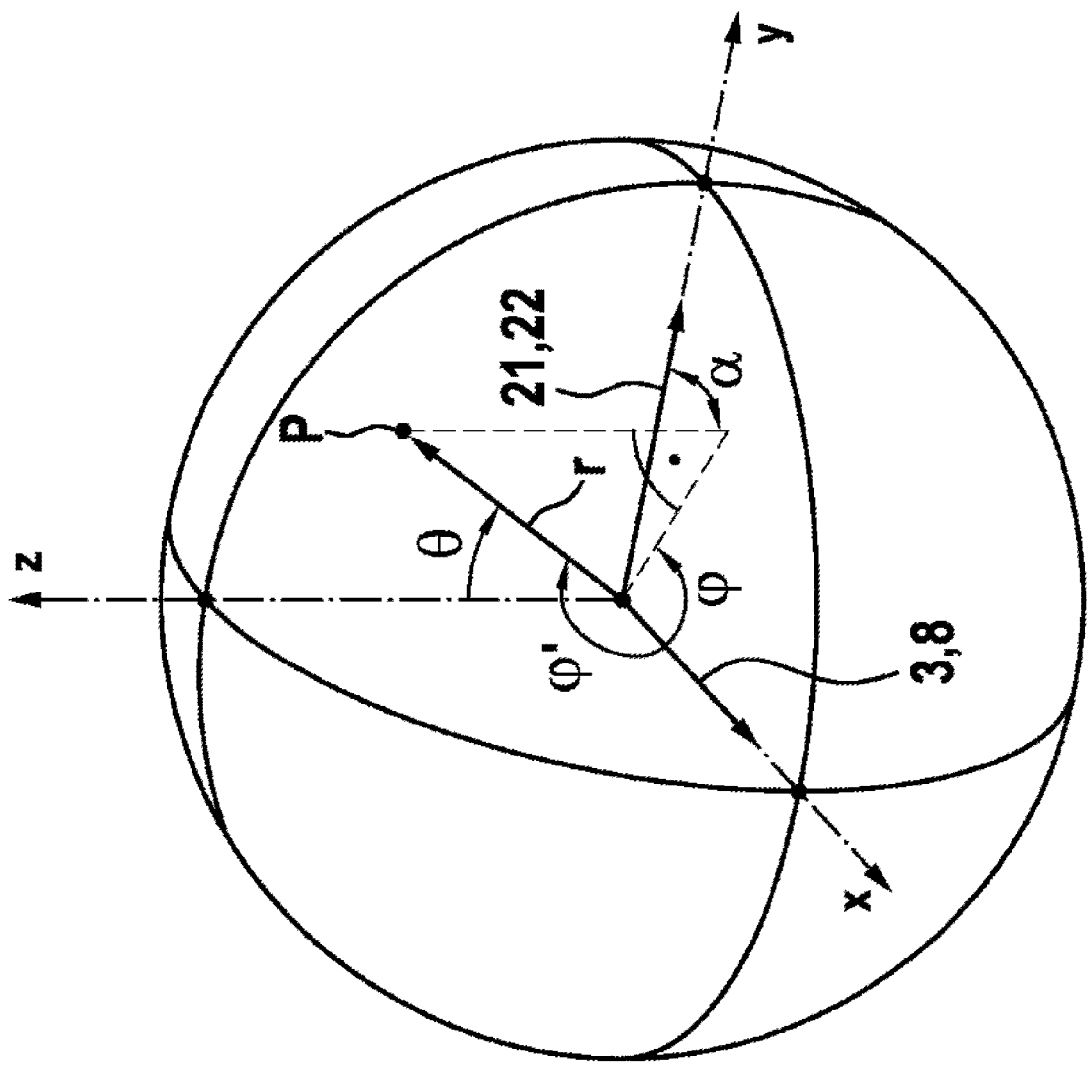
FIG. 4 shows a sensor coordinate system for defining various angles in a three-dimensional space with respect to one of the distance sensors, according to an example embodiment of the present invention.

To describe the principle underlying the first and second comparison value, reference is made initially to FIG. 4, which depicts a sensor coordinate system of one of distance sensors 1, 6. First or second distance sensor 1, 6 is selectively situated in the center of the depicted sensor coordinate system. The xy-plane of the sensor coordinate system represents sensor plane 2, 7 associated with respective distance sensor 1, 6. Sensor axis 3, 8 of respective distance sensor 1, 6 extends along the x-axis depicted in FIG. 4. The y-axis corresponds to main radiation axis 21, 22 of respective distance sensor 1, 6. One of the angles depicted in FIG. 4, if it is referred to below, is marked with the index "1" if it is associated with first distance sensor 1, and is marked with index "2" if it is associated with second distance sensor 6. Thus, first angle $\varphi_1'$ is angle $\varphi'$ depicted in FIG. 4, which is associated with first distance sensor 1. Second angle $\varphi_2'$ is correspondingly angle $\varphi'$ depicted in FIG. 4, which is associated with second distance sensor 6.

A point P is depicted in FIG. 4, which represents an exemplary location of object 5. A distance r between respective distance sensor 1, 6, i.e., the origin of the depicted sensor coordinate system, and point P corresponds to the distance detected by distance sensor 1, 6, i.e., to first distance 4 or to second distance 9.

Both first distance sensor 1 as well as second distance sensor 6 are configured to detect an angle $\varphi$, which describes a direction in which object 5, starting from first distance sensor 1, is situated when object 5 is situated in first sensor plane 2. For an evaluation of angle $\varphi$ detected by one of distance sensors 1, 6, distance sensors 1, 6 also output a measured value for angle $\varphi'$ when object 5 is not situated in sensor plane 2, 7. The reason for this, among others, is that a signal emitted by distance sensors 1, 6 is not sharply delimited and, thus, is reflected in any case also outside the sensor plane and can be reflected back again to emitting distance sensor 1, 6. Therefore, angle $\varphi'$ is actually detected by distance sensors 1, 6, even if distance sensors 1, 6 are designed to merely detect an angle $\varphi$ in associated sensor plane 2, 7.

Angles $\varphi$ and $\varphi'$ are defined relative to sensor axis (x-axis) in FIG. 4. Angle $\theta$ is defined relative to the z-axis. Point P has the following coordinates in the sensor coordinate system:

$$x_p = \cos(\varphi) \cdot \sin(\theta) \cdot r = \cos(\varphi') \cdot r$$

$$x_p = \cos(\varphi) \cdot \sin(\theta) \cdot r = \cos(\varphi') \cdot r$$

$$\varphi = \cos^{-1}\left(\frac{\cos(\varphi')}{\sin(0)}\right)$$

$$y_p = \sin(\varphi) \cdot \sin(\theta) \cdot r = \sin\left(\cos^{-1}\left(\frac{\cos(\varphi')}{\sin(0)}\right)\right) \cdot \sin(\theta) \cdot r$$

$$z_p = \cos(\theta) \cdot r$$

Where:

$$90° - \varphi' \le \theta \le 90° + \varphi' \text{ and } 90° - \theta \le \varphi' \le 90° + \theta, \text{ for } y \ge 0.$$

Figure 5:
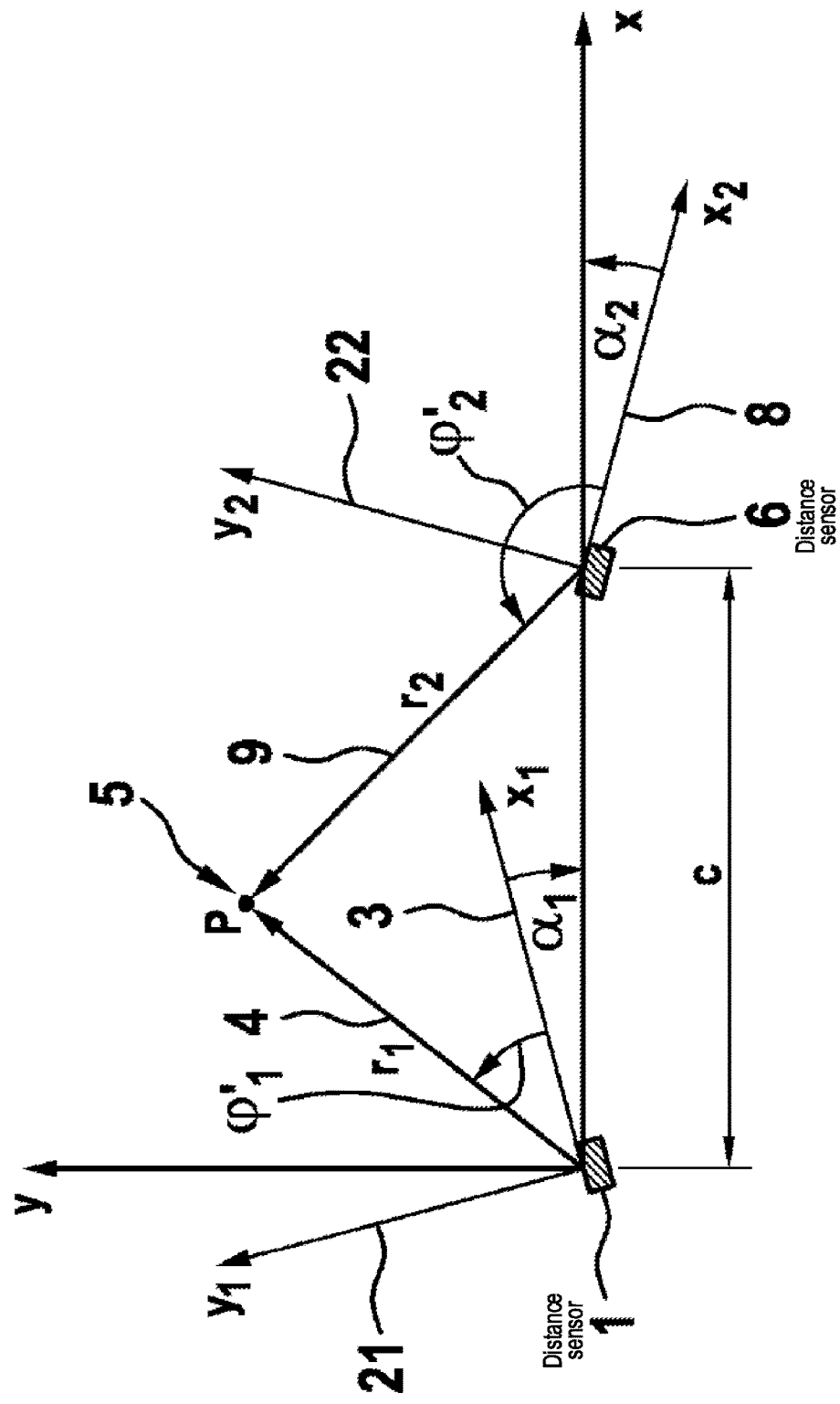
FIG. 5 shows a global coordinate system, in which the first distance sensor and the second distance sensor are depicted, according to an example embodiment of the present invention.

First distance sensor 1 and second distance sensor 6 are depicted in a global coordinate system in FIG. 5. The associated angles for the two distance sensors 1, 6 are also reproduced, in each case according to the sensor coordinate system depicted in FIG. 4. Thus, the x-axis and the y-axis for each of distance sensors 1, 6 are reproduced according to the sensor coordinate system known from FIG. 4. First distance sensor 1 and second distance sensor 6 are situated in a shared sensor plane, which is depicted in FIG. 5. In this case, an angle of greater than 0 degrees, preferably of greater than 1 degree or greater than 5 degrees, exists between first sensor axis 3 and second sensor axis 8. This means that first distance sensor 1 and second distance sensor 6 are tilted toward each other in the sensor plane. In addition, first distance sensor 1 is situated on vehicle 12 in such a way that a first tilt angle $\alpha_1$ of greater than 0 degrees exists between the x-axis of the global coordinate system and first sensor axis 3. At the same time, second distance sensor 6 is situated in such a way that a second tilt angle $\alpha_2$ of greater than 0 degrees exists between the x-axis of the global coordinate system and second sensor axis 7. In this case, first tilt angle $\alpha_1$ is not equal to second tilt angle $\alpha_2$ multiplied by $-1$.

First distance sensor 1 and second distance sensor 6 exhibit a distance relative to each other, which is referred to as sensor distance c. This distance corresponds to an x-value of the global coordinate system depicted in FIG. 5, which is also referred to as $x_{Sensor\ 2}$. Sensor distance c is a function of a mounting position of first distance sensor 1 and of second distance sensor 6, and is predefined to evaluation unit 10 in an initial configuration. Sensor distance c is thus a predefined distance between first distance sensor 1 and second distance sensor 6. The mounting position of first distance sensor 1 and of second distance sensor 6 on vehicle 12 in this case is selected in such a way that the two distance sensors 1, 6 are situated at a sensor height $z_0$ over roadway surface 23.

The following is applicable for a coordinate transformation with a counterclockwise rotation (mathematically positive direction of rotation) for the global coordinate system depicted in FIG. 5:

$$x'_p = x_p \cdot \cos(\alpha) + y_p \cdot \sin(\alpha)$$

$$y'_p = x_p \cdot \sin(\alpha) + y_p \cdot \cos(\alpha)$$

$$z'_p = z_p$$

The results are the following equations with the unknown height angles $\theta_1$ and $\theta_2$, which can be exactly determined by solving the equation system or can be estimated by comparison with a table. Thus, the following global equation system results for the global coordinate system depicted in FIG. 5:

$$x'_p = \cos(\varphi'_p) \cdot r_1 \cos(\alpha_1) - \sin\left(\cos^{-1}\left(\frac{\cos(\varphi')}{\sin(\theta_1)}\right)\right) \sin(\theta_1) \cdot r_1 \sin(\alpha_1) =$$

$$\cos(\varphi'_2) \cdot r_2 \cos(\alpha_2) - \sin\left(\cos^{-1}\left(\frac{\cos(\varphi'_2)}{\sin(\theta_2)}\right)\right) \sin(\theta_2) \cdot r_2 \sin(\alpha_2) + c$$

$$y'_p = \cos(\varphi'_1) \cdot r_1 \sin(\alpha_1) + \sin\left(\cos^{-1}\left(\frac{\cos(\varphi'_1)}{\sin(\theta_1)}\right)\right) \sin(\theta_1) \cdot r_1 \sin(\alpha_1) =$$

$$-\cos(\varphi'_2) \cdot r_2 \cos(\alpha_2) + \sin\left(\cos^{-1}\left(\frac{\cos(\varphi'_2)}{\sin(\theta_2)}\right)\right) \sin(\theta_2) \cdot r_2 \sin(\alpha_2)$$

$$z'_p = \cos(\theta_1) \cdot r_1 = \cos(\theta_2) \cdot r_2$$

As is apparent from FIG. 4, height angles $\theta_1$ and $\theta_2$ describe a position of object 5 with respect to distance sensors 1, 6 in the vertical direction. Height angles $\theta_1$ and $\theta_2$ thus also describe at which height object 5 is located above or below predefined height 11 over the first sensor plane.

Since first angle $\varphi_1'$ and second angle $\varphi_2'$ and distances $r_1$ and $r_2$ are detected by the two distance sensors 1, 6, it is possible to resolve the global equation system and height angles $\theta_1$ and $\theta_2$ are determined. In alternative example embodiments of the present invention, a mathematical resolution of the global equation system therefore takes place via evaluation unit 10, in order to thereby determine based on first distance 4, on second distance 9, on first angle $\varphi_1'$, and on second angle $\varphi_2'$ whether object 5 is located above or below a predefined height 11 over first sensor plane 2.

In this example embodiment, however, a calculation of the first comparison value or of the second comparison value takes place. The comparison values describe a value for second distance 9 or for second angle $\varphi_2'$ when object 5 is located at a predefined height 11 over first sensor plane 2. Such values for second distance 9 or for second angle $\varphi_2'$ can be ascertained based on the global equation system, such values being assumed for height angles $\theta_1$ and $\theta_2$, which result when object 5 is located at a predefined height 11.

In this example embodiment, therefore, the first and the second comparison values are continuously recomputed. Alternatively, the computations are carried out and stored in advance for different measured value combinations of distance sensors 1, 6. In this case, the first or the second comparison values can be retrieved from a table. The first comparison value ascertained for instantaneously detected measured values is compared with second distance 9. If the first comparison value equals second distance 9, it is then determined that object 5 is located at predefined height 11 over first sensor plane 2. The second comparison value ascertained for instantaneously detected measured values is compared with second angle $\varphi_2'$. If the second comparison value equals second angle $\varphi_2'$, then object 5 is located at predefined height 11 over first sensor plane 2.

As previously described, first sensor axis 3 and second sensor axis 8 are tilted toward each other. This is in order to determine, based on the previously described mathematical principle, whether object 5 is located at predefined height 11 over first sensor plane 2. If first sensor axis 3 and second sensor axis 8 are not tilted toward each other, situations can occur in which it is not possible to clearly distinguish whether object 5 is located above or below predefined height 11.

Figure 6:
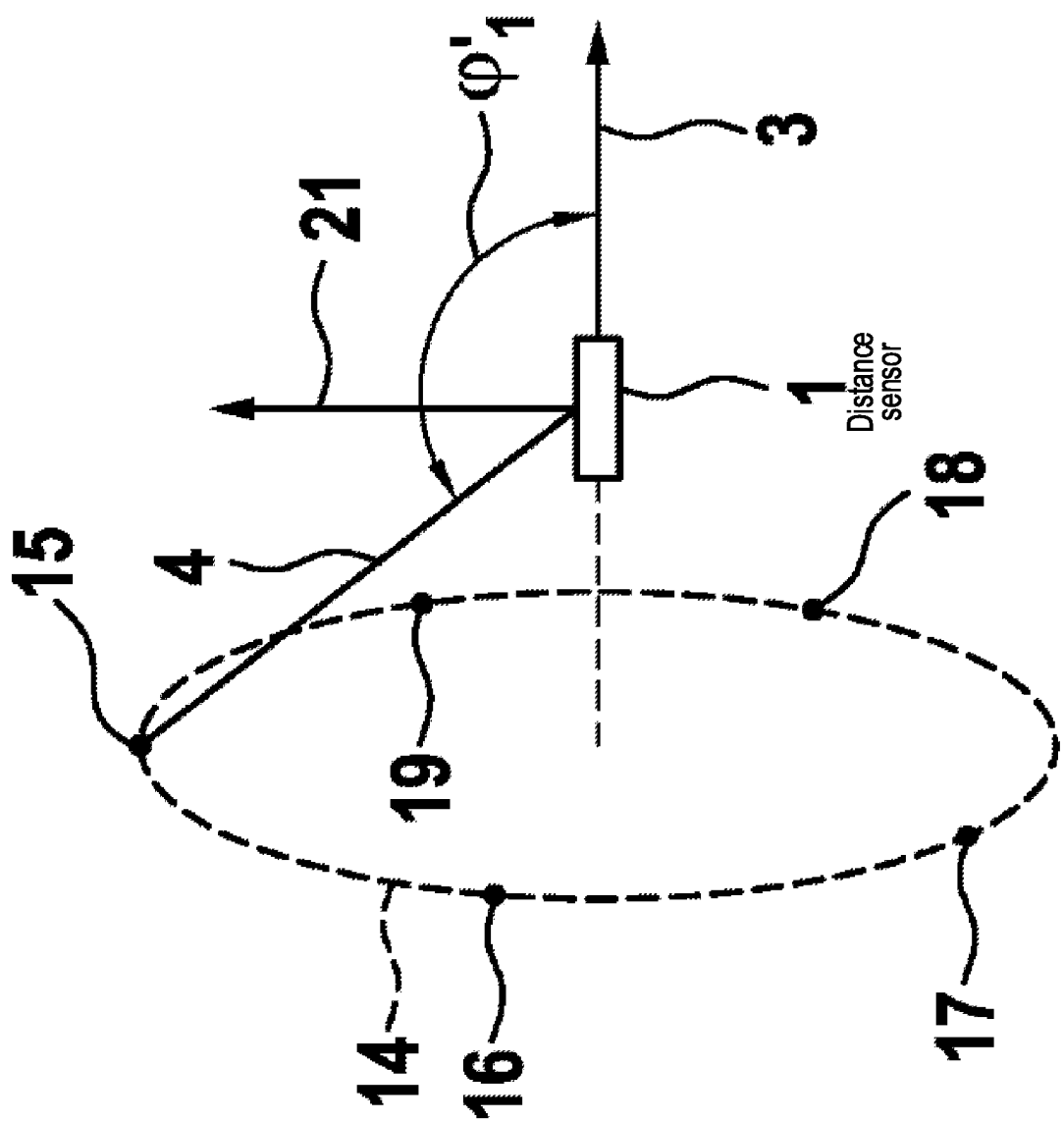
FIG. 6 shows a representation of the first distance sensor with associated potential locations of an object, according to an example embodiment of the present invention.

First distance sensor 1 is depicted in FIG. 6. In this case, potential locations 15, 16, 17, 18, 19 for object 5 are depicted to the left next to first distance sensor 1, which result when a particular value for first angle $\varphi_1'$ has been detected and a particular value for first distance 4 has been detected. Potential locations 15, 16, 17, 18, 19 are depicted as points on a circular path 14. It is understood that each point on circular path 14 is a potential location point, but only some of the location points are depicted by way of example. Each of the potential location points 15, 16, 17, 18, 19 on circular path 14 exhibit the same distance 4 with respect to first distance sensor 1.

First angle $\varphi_1'$ is an angle that describes a position of object 5 if the object is situated in first sensor plane 2. However, object 5 is not necessarily situated in first sensor plane 2. If object 5 moves out of first sensor plane 2, first angle $\varphi_1'$ is still output by first distance sensor 1. Only when object 5 is situated in first sensor plane 2 does it result that first angle $\varphi_1'$ corresponds to angle $\varphi$ shown in FIG. 4.

Thus, starting from first distance 4 and angles $\varphi_1'$, which have been detected by first distance sensor 1, object 5 could be situated anywhere on first circular path 14.

If an angle of 0° were then to exist between first sensor axis 3 and second sensor axis 8, then a situation occurs in which the potential locations of object 5 defined by the measured values of distance sensor 1 coincide exactly with the potential locations of object 5 defined by second distance sensor 6. In other words, this means that a circular path, which defines potential locations 15 through 19 with respect to first distance sensor 1, i.e., first circular path 14, coincides with a circular path, for example, a second circular path 20, which defines potential locations of object 5 with respect to second distance sensor 6. The previously described case can occur for all positions of object 5.

Figure 7:
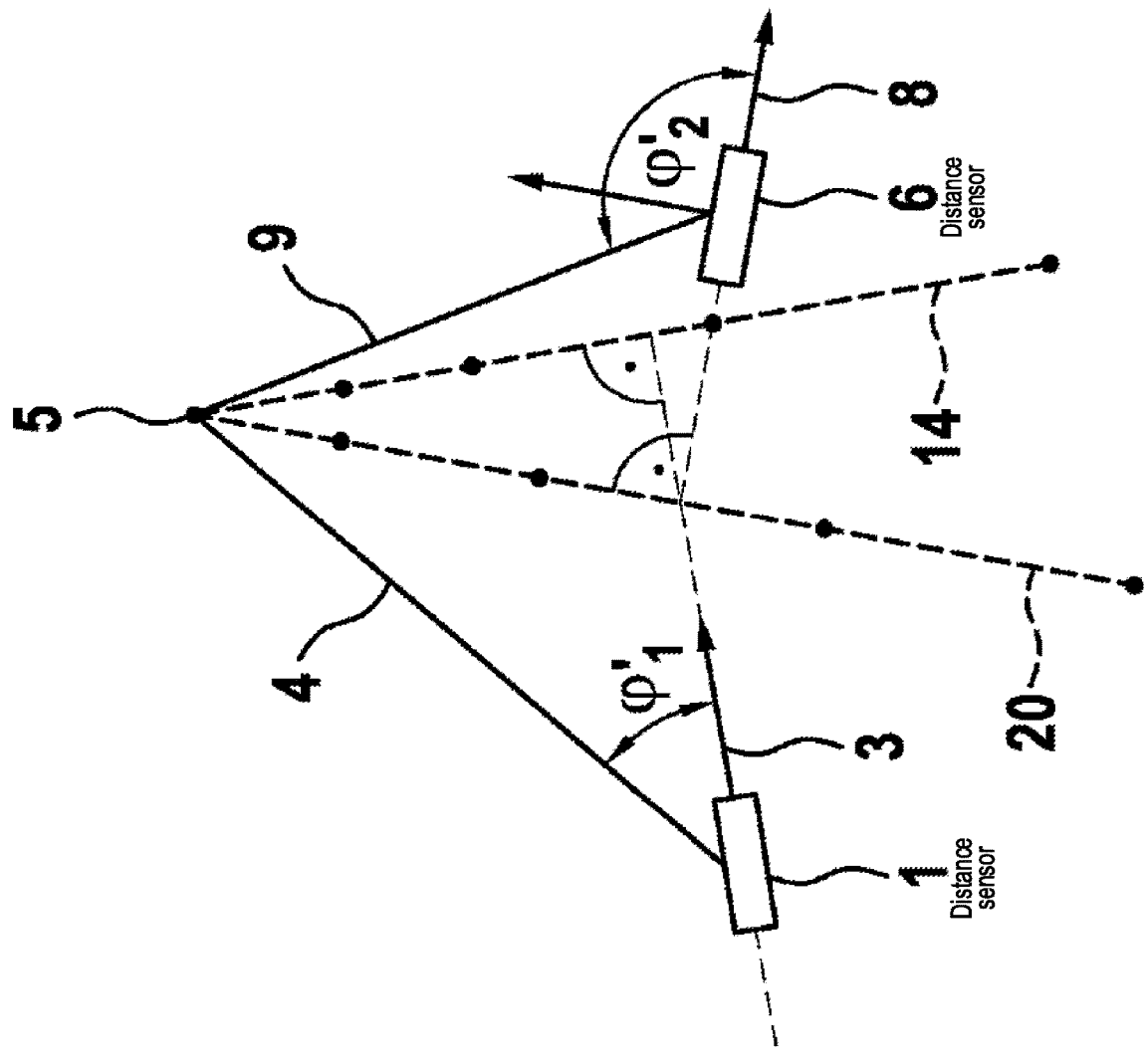
FIG. 7 shows a representation of the device for identifying a position of an object for a case in which the object is situated in the first sensor plane, according to an example embodiment of the present invention.
Figure 8:
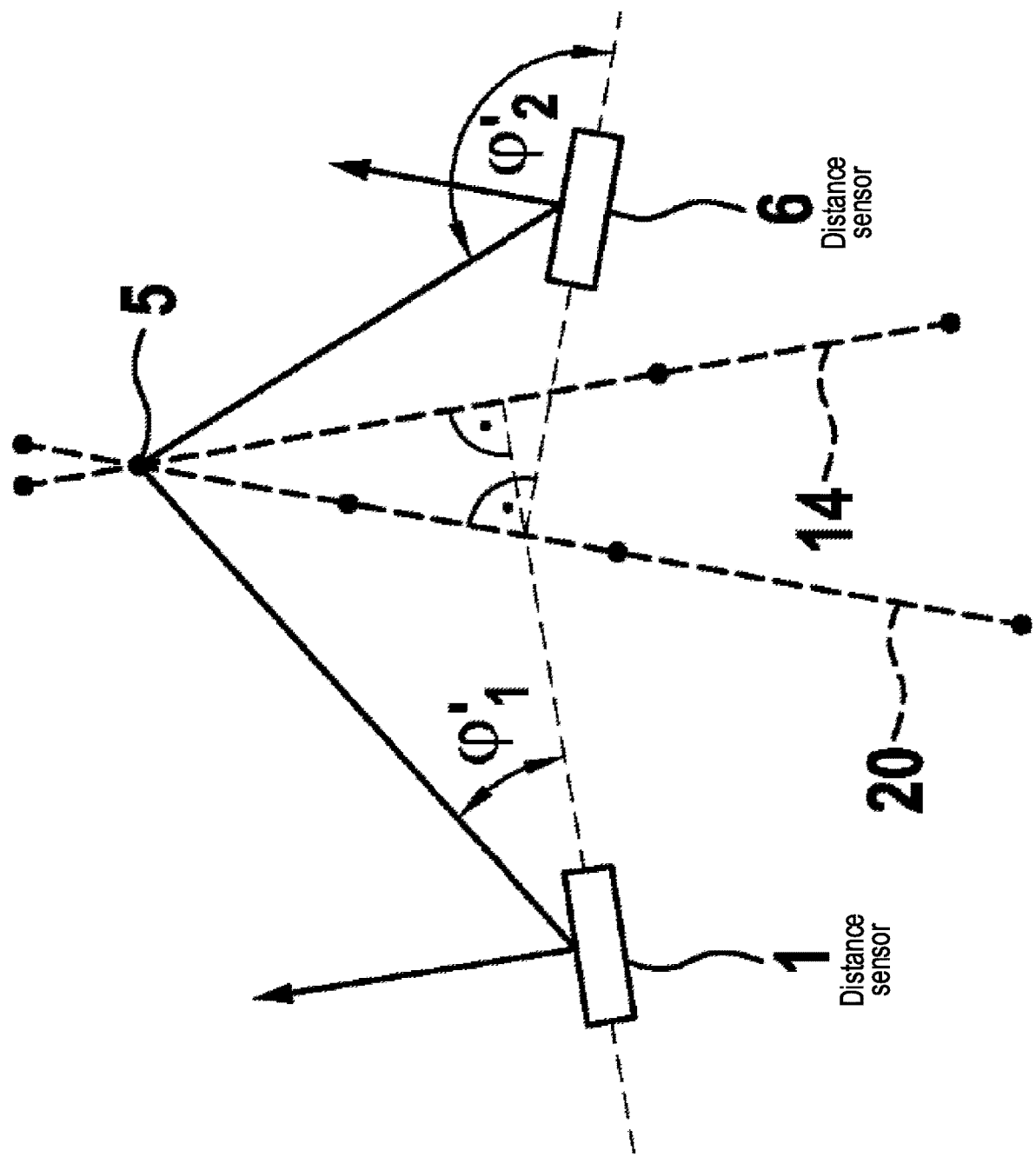
FIG. 8 shows a representation of the device for identifying a position of an object in a state in which the object is situated over or under the first sensor plane, according to an example embodiment of the present invention.

However, first distance sensor 1 is tilted with respect to second distance sensor 6. An angle of greater than 0° thus exists between first sensor axis 3 and second sensor axis 8. This is depicted by way of example in FIG. 7 and in FIG. 8. FIG. 7 in this case describes a situation, in which object 5 is situated in first sensor plane 2. FIG. 8 describes a situation, in which object 5 is situated outside first sensor plane 2.

In FIG. 7, it is apparent that potential locations of object 5 are defined by first distance sensor 1. These are defined by first circular path 14, which is depicted in a top view in FIG. 8, since this circular path is perpendicular to first sensor plane 2. Potential locations of object 5 are similarly defined by second distance sensor 6. These locations are situated accordingly on second circular path 20. Since sensor axes 3, 8 of first distance sensor 1 and of second distance sensor 6 are tilted toward each other, i.e., are not parallel or identical, first circular path 14 and second circular path 20 are thus also no longer able to coincide. The result is exactly one point of intersection between first circular path 14 and second circular path 20 when object 5 is situated in sensor plane 2. Thus, it is clearly determined for a particular value for second distance 9 whether or not object 5 is situated in first sensor plane 2.

It is apparent when viewing FIG. 8 that two points of intersection result between first circular path 14 and second circular path 20 for a case in which object 5 is situated outside first sensor plane 2. Thus, it is not possible to distinguish whether an object 5 is situated above or below first sensor plane 2. Still, it is possible to calculate at which point first circular path 14 and second circular path 20 intersect each other and to thus verify a distance relative to first sensor plane 2.

Since the computations necessary for this purpose, which would have to be carried out by evaluation unit 10, can be very complex, it is advantageous to ascertain the comparison value based on a table, in which first distance 4 and first angle $\varphi_1'$ are each assigned a comparison value. Such a table can be calculated in advance. Accordingly, threshold values for output signals of second distance sensor 6 can be established and it can be determined via an analogous comparison whether a tall or a low object 5 has been detected.

Figure 9:
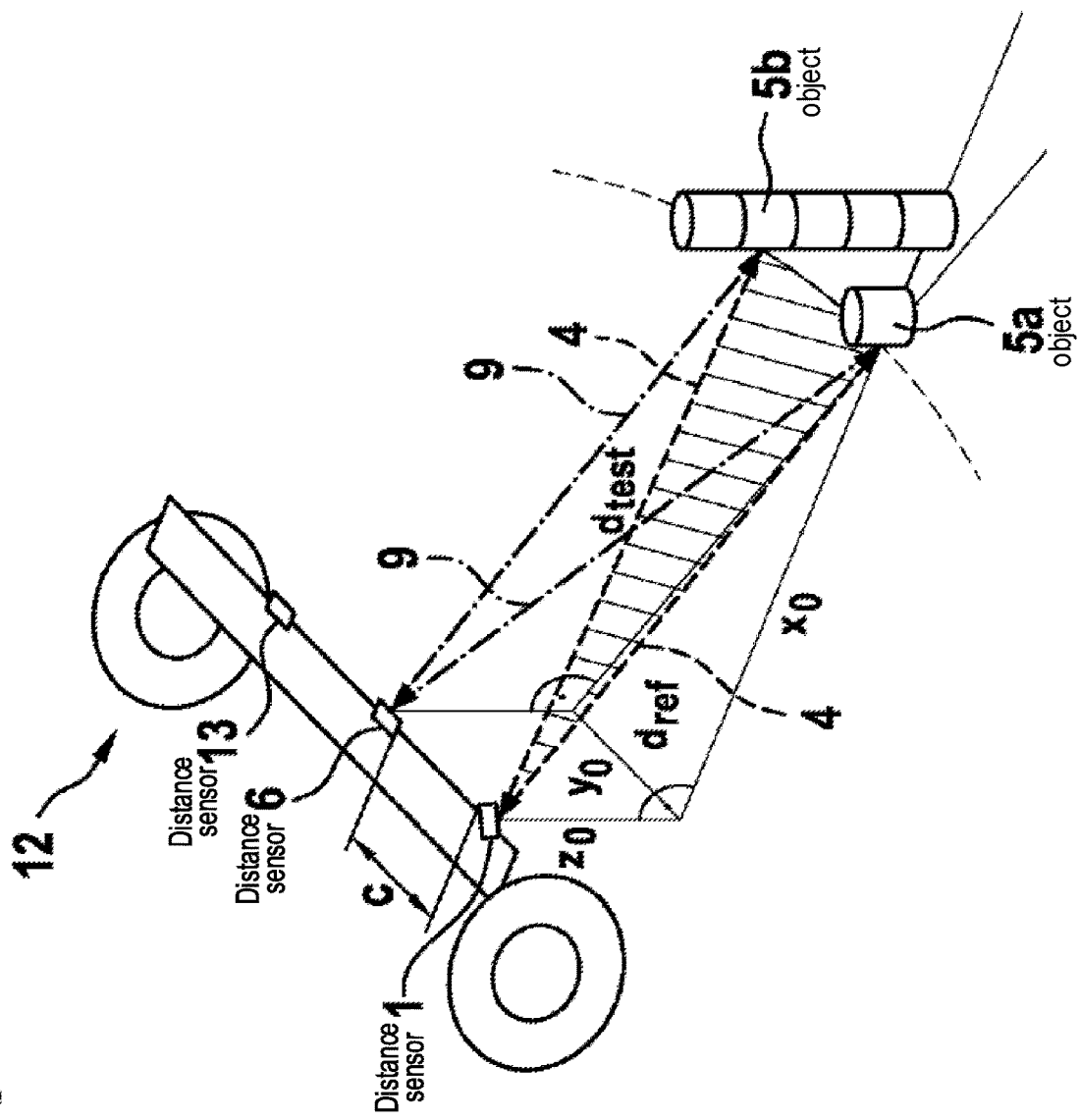
FIG. 9 shows a representation of an arrangement of the first distance sensor and of the second distance sensor over a roadway surface, according to an example embodiment of the present invention.

In order to determine whether object 5 is located above or below first or second sensor plane 2, 7, a third distance detected by a third distance sensor 13 and/or a third angle detected by a third distance sensor is evaluated by the evaluation unit in an alternative example embodiment. An exemplary arrangement of third distance sensor 13 is depicted in FIG. 9. Third distance sensor 13 in this case has a third sensor axis situated in a third sensor plane, the third sensor plane not being equal to first sensor plane 2 and second sensor plane 7. Third distance sensor 13 detects the third distance between third distance sensor 13 and object 5 and the third angle, which is situated in third sensor plane 7 and is between the third sensor axis and a direction in which, starting from the third distance sensor, object 5 is located. The previously described equation system is extended and evaluated accordingly for this purpose.

A validation can alternatively or additionally take place by third distance sensor 13, as to whether object 5 is actually located above or below predefined height 11 over first sensor plane 2. The previously described equation system is expanded and evaluated accordingly for this purpose. In this case, it is not necessary that a sensor plane of third distance sensor 13 is not equal to first sensor plane 2 and second sensor plane 7.

This method can therefore be easily expanded to more than two distance sensors. A reference measurement is carried out using one distance sensor. All other sensors measure the distance and the horizontal angle. It is analyzed at which object height the measured additional sensor values are better suited. If multiple sensors are available, it is possible to always use the optimal sensor for reference measurement.

What is claimed is:

1. A device comprising:
   a first distance sensor, a sensor axis of which is a first sensor axis that is situated in a first sensor plane, wherein the first distance sensor is configured to detect:
      a first distance, which is between the first distance sensor and an object; and
      a first angle, which is between the first sensor axis and a direction from the first distance sensor to a location of the object when the object is located in the first sensor plane;
   a second distance sensor, a sensor axis of which is a second sensor axis that is situated in a second sensor plane, wherein an angle that is greater than zero degrees exists between the first sensor axis and the second sensor axis and wherein the second distance sensor is configured to detect:
      a second distance, which is between the second distance sensor and the object; and/or
      a second angle, which is between the second sensor axis and a direction from the second distance sensor to a location of the object when the object is located in the second sensor plane; and
   an evaluation unit, wherein the evaluation unit is configured to determine, based on the first distance, the first angle, and at least one of the second distance and the second angle, whether the object is located above or below a predefined height over the first sensor plane, and calculate, based on the first distance and the first angle, a comparison value that corresponds to at least one of the second distance or the second angle when the object is located at a predefined height over the first sensor plane.

2. The device of claim 1, wherein the first sensor plane and the second sensor plane are parallel or identical planes.

3. The device of claim 1, wherein the first sensor plane and/or the second sensor plane are horizontal planes.

4. The device of claim 1, further comprising a third distance sensor, a sensor axis of which is a third sensor axis that is situated in a third sensor plane, wherein:
   the third sensor plane different than the first sensor plane and than the second sensor plane, and wherein the third distance sensor is configured to detect:
      a third distance, which is between the third distance sensor and the object, and/or
      a third angle, which is situated in the third sensor plane and which is between the third sensor axis and a direction from the third sensor axis and a location of the object; and
   the evaluation unit is configured to ascertain, based on the third distance and/or the third angle, whether the object is located above or below the first or second sensor plane.

5. The device of claim 1, wherein the first distance sensor and/or the second distance sensor is a radar sensor, an acoustic sensor, or a visual sensor.

6. A device comprising:
   a first distance sensor, a sensor axis of which is a first sensor axis that is situated in a first sensor plane, wherein the first distance sensor is configured to detect:
      a first distance, which is between the first distance sensor and an object; and
      a first angle, which is between the first sensor axis and a direction from the first distance sensor to a location of the object when the object is located in the first sensor plane;
   a second distance sensor, a sensor axis of which is a second sensor axis that is situated in a second sensor plane, wherein an angle that is greater than zero degrees exists between the first sensor axis and the second sensor axis and wherein the second distance sensor is configured to detect:
      a second distance, which is between the second distance sensor and the object; and/or
      a second angle, which is between the second sensor axis and a direction from the second distance sensor to a location of the object when the object is located in the second sensor plane; and
   an evaluation unit, wherein the evaluation unit is configured to determine, based on the first distance, the first angle, and at least one of the second distance and the second angle, whether the object is located above or below a predefined height over the first sensor plane,
   wherein the evaluation unit is configured to:
   calculate, based on the first distance and the first angle, a comparison value that corresponds to the second distance when the object is located at a predefined height over the first sensor plane; and
   compare the second distance and the comparison value to each other to determine whether the object is located above or below the predefined height over the first sensor plane.

7. The device of claim 6, wherein the comparison value is computed additionally based on the second angle.

8. The device of claim 6, wherein the comparison value is ascertained based on a table.

9. The device of claim 6, wherein the comparison value is ascertained based on a predefined distance between the first distance sensor and the second distance sensor.

10. A device comprising:
    a first distance sensor, a sensor axis of which is a first sensor axis that is situated in a first sensor plane, wherein the first distance sensor is configured to detect:
       a first distance, which is between the first distance sensor and an object; and
       a first angle, which is between the first sensor axis and a direction from the first distance sensor to a location of the object when the object is located in the first sensor plane;
    a second distance sensor, a sensor axis of which is a second sensor axis that is situated in a second sensor plane, wherein an angle that is greater than zero degrees exists between the first sensor axis and the second sensor axis and wherein the second distance sensor is configured to detect:

a second distance, which is between the second distance sensor and the object; and/or a second angle, which is between the second sensor axis and a direction from the second distance sensor to a location of the object when the object is located in the second sensor plane; and an evaluation unit, wherein the evaluation unit is configured to determine, based on the first distance, the first angle, and at least one of the second distance and the second angle, whether the object is located above or below a predefined height over the first sensor plane, wherein the evaluation unit is configured to:

calculate, based on the first distance and the first angle, a comparison value that corresponds to the second angle when the object is located at a predefined height over the first sensor plane; and compare the second angle and the comparison value to each other to determine whether the object is located above or below the predefined height over the first sensor plane.

11. The device of claim 10, wherein the comparison value is computed additionally based on the second distance.

12. The device of claim 10, wherein the comparison value is ascertained based on a table.

13. The device of claim 10, wherein the comparison value is ascertained based on a predefined distance between the first distance sensor and the second distance sensor.

14. A device comprising:
a first distance sensor, a sensor axis of which is a first sensor axis that is situated in a first sensor plane, wherein the first distance sensor is configured to detect:
  a first distance, which is between the first distance sensor and an object; and
  a first angle, which is between the first sensor axis and a direction from the first distance sensor to a location of the object when the object is located in the first sensor plane;
a second distance sensor, a sensor axis of which is a second sensor axis that is situated in a second sensor plane, wherein an angle that is greater than zero degrees exists between the first sensor axis and the second sensor axis and wherein the second distance sensor is configured to detect:
  a second distance, which is between the second distance sensor and the object; and/or
  a second angle, which is between the second sensor axis and a direction from the second distance sensor to a location of the object when the object is located in the second sensor plane; and an evaluation unit, wherein the evaluation unit is configured to determine, based on the first distance, the first angle, and at least one of the second distance and the second angle, whether the object is located above or below a predefined height over the first sensor plane, further comprising a third distance sensor, a sensor axis of which is a third sensor axis that is situated in a third sensor plane, wherein the third distance sensor is configured to detect a third distance, which is between the third distance sensor and the object, and wherein the evaluation unit is configured to validate, based on the third distance, whether it has been correctly determined whether the object is located above or below the predefined height over the first sensor plane.

15. A method performed using a device that includes (a) a first distance sensor, a sensor axis of which is a first sensor axis situated in a first sensor plane and (b) a second distance sensor, a sensor axis of which is a second sensor axis situated in a second sensor plane, wherein an angle of greater than zero degrees exists between the first sensor axis and the second sensor axis, the method comprising:

detecting a first distance, which is between the first distance sensor and an object;

detecting a first angle, which is between the first sensor axis and a direction from the first distance sensor to a location of the object when the object is located in the first sensor plane;

detecting:
  a second distance, which is between the second distance sensor and the object; and/or
  a second angle, which is between the second sensor axis and a direction from the second distance sensor to a location of the object when the object is located in the second sensor plane; and determining, based on the first distance, the first angle, and at least one of the second distance and the second angle, whether the object is located above or below a predefined height over the first sensor plane, and calculating, based on the first distance and the first angle, a comparison value that corresponds to at least one of the second distance or the second angle when the object is located at a predefined height over the first sensor plane.

* * * * *